United States Patent
Genga

[11] Patent Number: 5,466,995
[45] Date of Patent: Nov. 14, 1995

[54] ZONING CIRCULATOR CONTROLLER

[75] Inventor: Richard A. Genga, East Greenwich, R.I.

[73] Assignee: Taco, Inc., Cranston, R.I.

[21] Appl. No.: 128,831

[22] Filed: Sep. 29, 1993

[51] Int. Cl.[6] ................................ H02K 7/14
[52] U.S. Cl. .................. 318/3; 318/779; 318/783; 417/45
[58] Field of Search .................. 237/8 R, 8 A, 237/8 B, 8, C, 8 D; 417/410.1, 422, 42–45; 318/3, 432–434, 778–788, 798–816; 388/903, 904

[56] References Cited

U.S. PATENT DOCUMENTS

| | | | |
|---|---|---|---|
| 1,752,892 | 4/1930 | Cumberland . | |
| 1,920,749 | 8/1933 | Hutt | 172/279 |
| 1,952,299 | 3/1934 | Van Valkenburg | 172/288 |
| 3,069,068 | 12/1962 | Hansen | 230/12 |
| 3,286,149 | 11/1966 | Cushing | 318/221 |
| 3,560,823 | 2/1971 | Nystuen | 318/221 |
| 4,012,678 | 3/1977 | Blaha . | |
| 4,030,009 | 6/1977 | Halsted | 318/221 R |
| 4,156,168 | 5/1979 | Vogel | 318/138 |
| 4,436,486 | 3/1984 | Jensen et al. | 417/45 |
| 4,546,300 | 10/1985 | Shaikh | 318/786 |
| 4,564,142 | 1/1986 | Cleer, Jr. | 237/8 |
| 4,629,116 | 12/1986 | Laing et al. | 237/8 |
| 4,863,100 | 9/1989 | Erhardt et al. | 237/8 |
| 4,958,118 | 9/1990 | Pottebaum | 318/727 |
| 5,049,801 | 9/1991 | Potter | 318/785 |

OTHER PUBLICATIONS

Taco In–Line™ Circulators Catalog 100–1.2, 1983.
Taco Cartridge Circulator Product Bulletins, 1989.
1992 Systems and Equipment Handbook, "Centrigfugal Pumps", Chapter 39, pp. 1–10.

Primary Examiner—David S. Martin
Attorney, Agent, or Firm—Fish & Richardson

[57] ABSTRACT

A zoning circulator for circulating fluid within a zone in a hydronic heating or cooling system includes a zoning circulator controller including a speed regulating circuit for controlling the speed of a circulator motor. The circulator controller also includes an override circuit for operating the circulator at a high speed, high starting torque for several seconds to overcome frictional resistances between the moving parts of the motor and then tapers down to the speed established by the speed regulating circuit.

15 Claims, 14 Drawing Sheets

ZONING CIRCULATOR CONTROLLER

BACKGROUND OF THE INVENTION

The invention relates generally to controlling circulators used in hydronic heating and cooling systems.

Such systems are often divided into zones, each zone serving a separate portion of a building and each zone controlled by its own thermostat. This allows a different temperature to be maintained in each area being heated or cooled. Zoning, i.e., diverting operating fluid into a given zone when necessary, is generally achieved using zone valves or circulators.

When zoning with circulators, a thermostatically-controlled pump is used to deliver operating fluid into each separate zone. As is most often found in the art today, a separate controller—containing a transformer and a switching element (e.g., relay)—controls the circulator for each zone. The transformer steps line voltage (usually 115 volts) down, usually to 24 volts. A thermostat in the particular zone controls the relay, the coil of which operates at the stepped-down voltage. When the relay contacts close, line voltage is passed to the pump, thereby powering the circulator.

In some examples of the existing art, a controller consisting of one transformer and several relays—one relay for each zone—is utilized. A thermostat in each zone controls each relay, and each relay passes line voltage to the circulator in the given zone.

Various forms of circulators are known. Some circulators employ a separate electrical motor coupled to a separate pump. Another form of circulator is the so-called "wet-rotor" circulator, in which the pump and motor are integrated, resulting in a more compact overall circulator unit. In a wet-rotor circulator, the rotor is supported within a rotor housing into which the fluid being circulated is allowed to enter (the fluid helps to lubricate the rotor bearings). The rotor housing is supported within a surrounding stator, which is sealed from the circulating fluid.

In most hydronic systems, electric motors are used to drive most circulator pumps with the pump impeller being mounted on a motor shaft extension. Other circulators are flexibly coupled through a pump mounting bracket or frame to the electric motor.

A number of variable-speed drive devices are available for operating such circulators, including fluid coupling, SCR variable frequency, direct current, wound rotor, and eddy current drives.

SUMMARY OF THE INVENTION

In general, the invention features a zoning circulator for circulating fluid through a hydronic heating or cooling system, including a wet-rotor circulator motor and a circulator controller. The circulator controller includes a speed regulating circuit activated when the zoning circulator is initially started, to operate the circulator motor for a predetermined duration (e.g., 3 to 7 seconds) at a speed setting sufficient to generate a torque for overcoming the frictional resistances between the moving components of the motor.

The speed regulating circuit is advantageous in hydronic systems where a circulating pump is required to be started at a relatively low speed or when the pump has not been operated for an extended period of time. If the circulating pump is turned on to operate at a relatively low speed, the torque generated by the pump at the low speed setting may be insufficient to overcome the frictional resistance between the parts. For a pump which has been lying dormant for an extended period, oxidation or corrosion may build up between the moving parts causing them to stick together. The speed regulating circuit provides the high starting torque for a period necessary for overcoming the frictional forces and then permits the motor to taper down to the desired low speed setting.

In one aspect of the invention, a zoning circulator for circulating fluid within a hydronic heating or cooling system includes a wet-rotor circulator motor and a circulator controller. The circulator controller includes a speed regulating circuit connected to the circulator motor to control the speed of the motor between a predetermined minimum speed setting and a predetermined maximum speed setting. The circulator motor is operated for a predetermined initial period at a speed setting sufficient to generate a torque to overcome frictional resistances in the circulator motor.

In another aspect of the invention, a zoning circulator for circulating fluid within a hydronic heating or cooling system includes a circulator motor and a circulator controller. The circulator controller includes an electrical switch, connected to the circulator motor, having at least one low voltage activation terminal and at least one pair of high voltage switched terminals for receiving a high voltage supply signal. The switch is configured to switch the high voltage switched terminals when low voltage is supplied to the activation terminals. A speed regulating circuit is connected to the electrical switch to control the speed of the circulator motor between a predetermined minimum speed setting and a predetermined maximum speed setting. An override circuit is connected to the electrical switch to override the speed regulating circuit when the high voltage supply signal is initially applied to the motor, thereby operating the circulator motor for a predetermined initial period at a speed sufficient to generate a torque for overcoming frictional resistances in the circulator motor. Thus, when the zoning circulator is initially started, the override circuit is activated to operate the circulator motor for several seconds at a speed setting sufficient to generate a torque for overcoming the frictional resistances between the moving components of the motor. The override circuit then relinquishes control to a speed regulating circuit to operate the motor at either a manually established speed or a variable speed determined by a thermostatic sensor or other external controller.

In some preferred embodiments of the invention, the zoning circulator further includes a voltage transforming device (e.g., a transformer) for receiving and transforming a high voltage supply signal to a low voltage and an electrical switching device (e.g., an electrical relay) connected to the transforming device having at least one low voltage activation input terminal and at least one pair of high voltage switched output terminals for receiving the high voltage supply signal. The switching device is configured to switch the output terminals when low voltage is supplied to the activation input terminals. The electrical switch of the circulator controller is connected between the electrical switching device and the circular motor and receives the high voltage supply signal from the electrical switching device. The speed regulating circuit establishes a manually adjusted speed of the circulator motor between the predetermined minimum and maximum speeds. The zoning circulator may include a minimum speed control device to establish a minimum speed of operation for the circulator motor.

In other preferred embodiments of the invention, the zoning circulator further includes an input circuit for receiving a low level electrical signal from a thermostat and for converting the electrical signal to a voltage signal representative of a desired speed setting of the motor. The zoning circulator further includes a time delay circuit for controlling the rate of switching of the electrical switch based on the voltage signal representative of a desired speed setting of the motor. The input circuit may include a solid-state AC switch for selecting low level electrical signals between 4 and 20 milliamperes or signals between zero and 10 volts. The time delay circuit includes a resistor and capacitor network and the rate of switching is related to the values of the resistor and capacitor. The circulator controller may further include a controller housing integral with the circulator motor, the housing having a single internal chamber in which the speed regulating circuit is located.

These and other features and advantages of the invention will be apparent from the following description of presently preferred embodiments and from the claims.

DESCRIPTION OF THE PREFERRED EMBODIMENT

Figure 1:
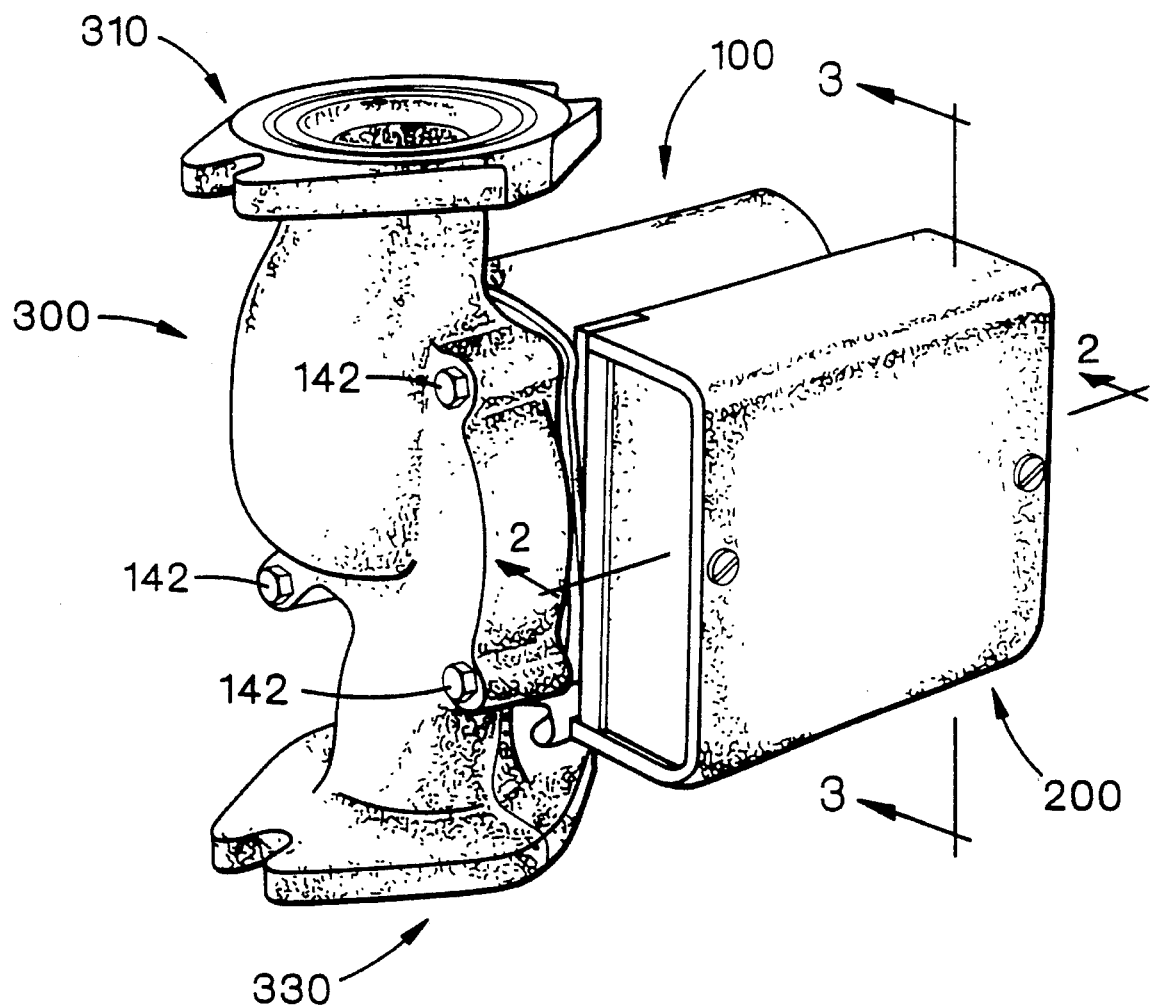
FIG. 1 shows a perspective view of the preferred embodiment of the zoning circulator.

As shown in FIG. 1, the zoning circulator comprises, generally, a motor 100, a controller 200, attached to motor 100, and an impeller casing 300, otherwise known as a volute.

Figure 2:
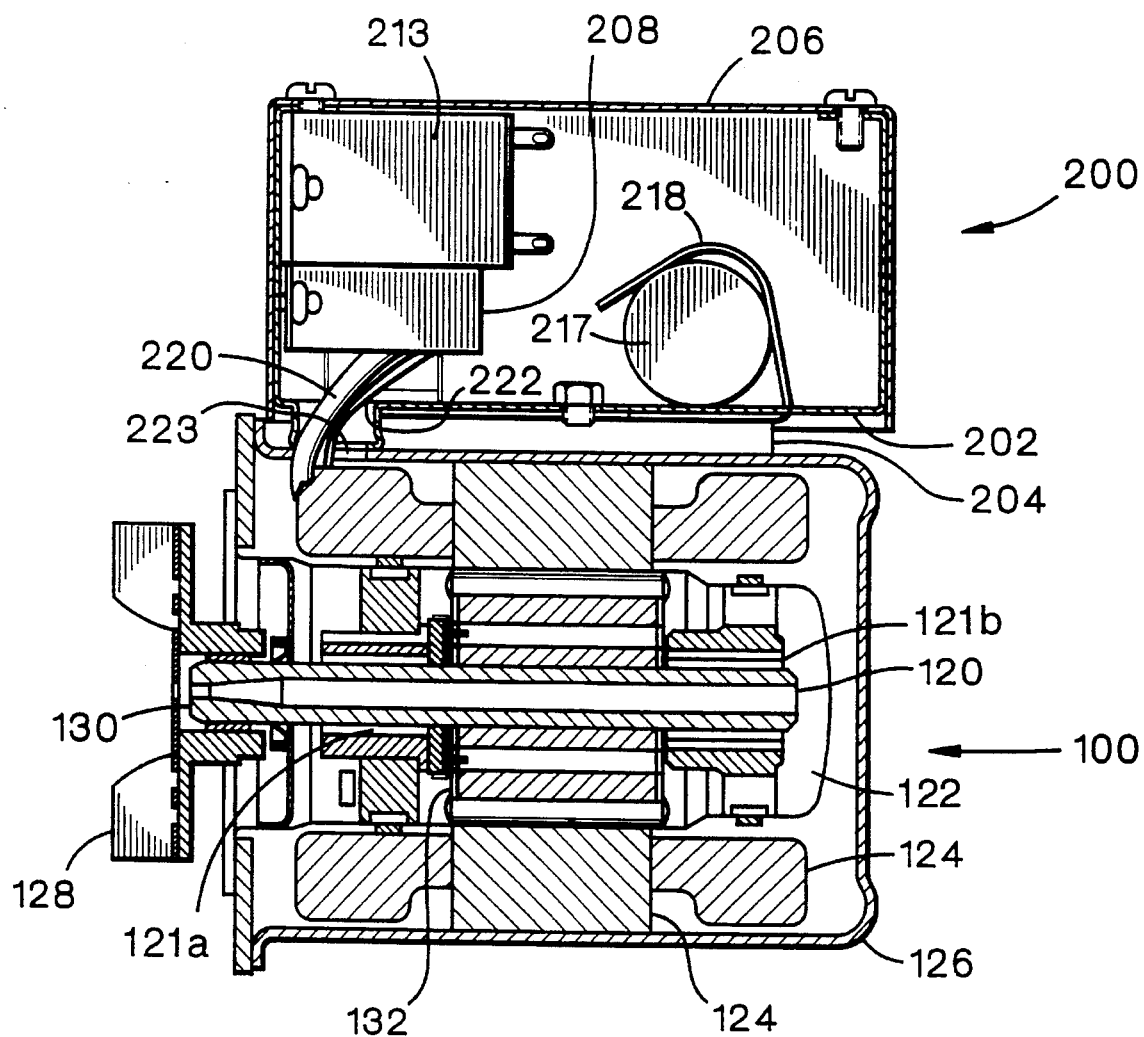
FIG. 2 shows a sectional plan view of the pump motor and controller of the zoning circulator, taken along 2—2 of FIG. 1, without showing the impeller casing.
Figure 3:
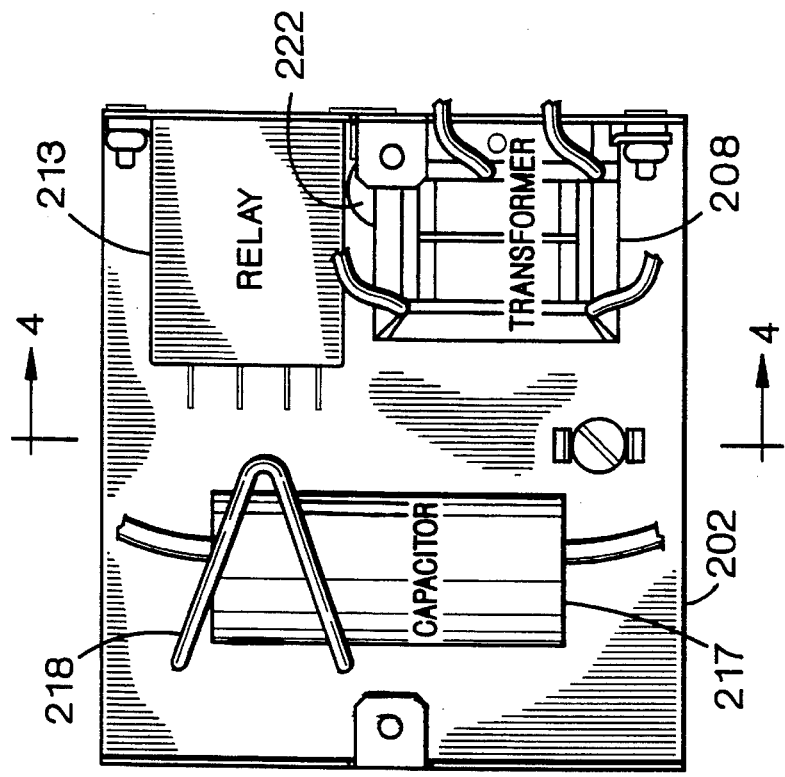
FIG. 3 shows a plan view of the controller with its cover removed taken along 3—3 of FIG. 1.
Figure 4:
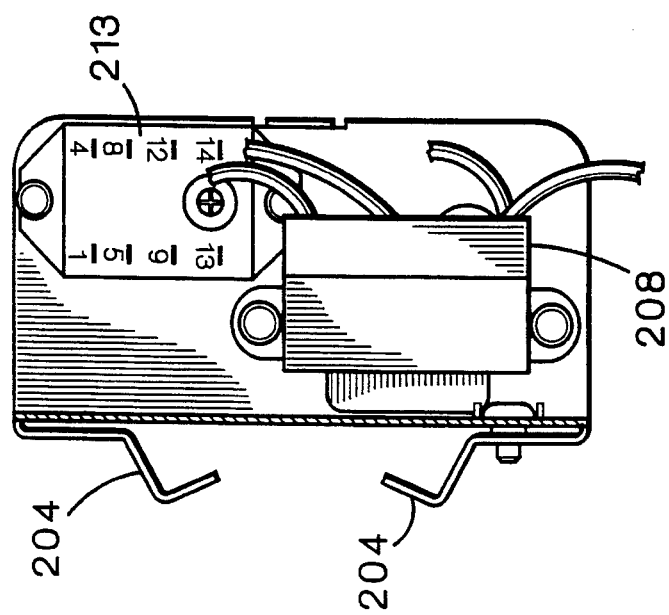
FIG. 4 shows a sectional end view of the controller of FIG. 3, taken along 4—4 of FIG. 3.

With reference to FIG. 2, the motor 100 is of the "wet-rotor" type, with a hollow shaft 120 and water lubricated bearings 121a, 121b. Motor 100 is enclosed in a rotor housing 122, preferably a replaceable cartridge. The rotor housing 122 containing the rotor assembly is located in the center of the stator 124, which is contained within the motor housing 126. An impeller 128 mounted to one end 130 of the rotor shaft protrudes into the impeller casing 300 (see FIG. 8) and performs the pumping action. When the windings 124 are electrically excited, the magnetic field created interacts with the squirrel cage rotor 132, causing the rotor and shaft 120 to rotate and hence the impeller 128.

Figure 5:
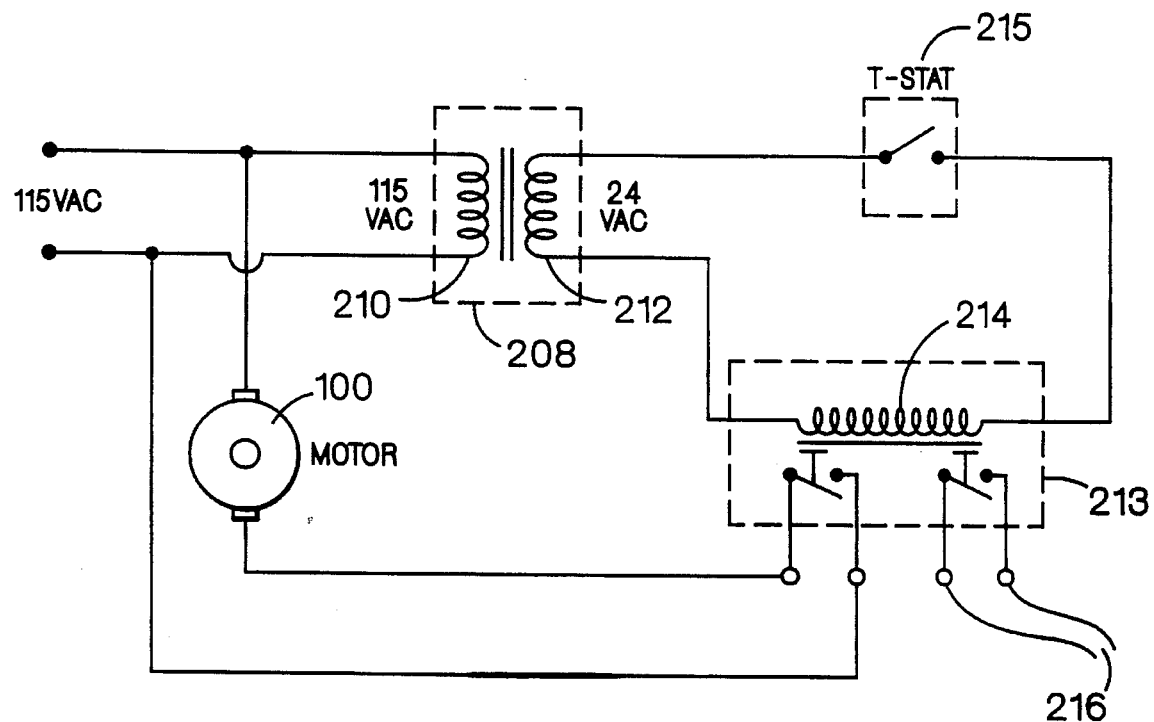
FIG. 5 shows schematically the primary electrical components of one embodiment of the zoning circulator.

With reference to FIGS. 2, 3, 4, 5, 6 and 7, the controller 200 consists of a sheet metal housing 202 attached to the side of the motor housing 126 with a mounting bracket 204. A sheet metal cover 206 encloses the controller. The controller houses a 2.5 volt-amp, Underwriter's Laboratories class II rated transformer 208. (Class II transformers are inherently current limited by including such impedance within the transformer as to limit the current output to a desired maximum value; they also are sometimes provided with a thermostat or other temperature sensitive device to limit the maximum temperature of the transformer.) The transformer has a 115 volt primary coil 210, into which flows line voltage, and a 24 volt secondary coil 212 (FIG. 5). A relay 213 (5 amp-240 volt AC, 5 amp-28 volt DC) is also provided. The relay coil 214 runs on 24 volts. The relay 213 may be double pole, single throw if only the motor 100 is to be controlled by the relay; alternatively, the relay 213 may be double pole, double throw (as shown) if an additional device, such as a boiler, is to be controlled concurrently with the pump 100. Additional leads 216 from the relay 213 lead to such an additional device.

Transformer 208 and relay 213 have electrical capabilities matched to the motor 100. These components are not oversized electrically as is typical with prior art controllers, which are designed to work with a range of motor sizes. Thus, instead of the 40 volt-ampere power rating of the transformer in a typical prior art controller, transformer 208 has a 2.5 volt-ampere rating, which is approximately 20% greater than the expected power draw of relay 213. Similarly, instead of the 30 ampere current rating of the relay in a typical prior art controller, relay 213 has a 5 ampere current rating, which is approximately 25% greater than the expected maximum current draw of motor 100. In this sense the transformer is matched to the relay, and the relay is matched to the motor, i.e., their electrical ratings are not substantially greater (not more than 50% greater) than the expected peak electrical demands of the relay and motor, respectively. A small amount of overrating of the transformer and relay is necessary to account for manufacturing tolerances, and variations in loading under field conditions.

A thermostat 215 located in the building zone associated with the given zoning circulator is wired in series with the relay 213 and triggers the relay 213 when it closes.

Figure 6:
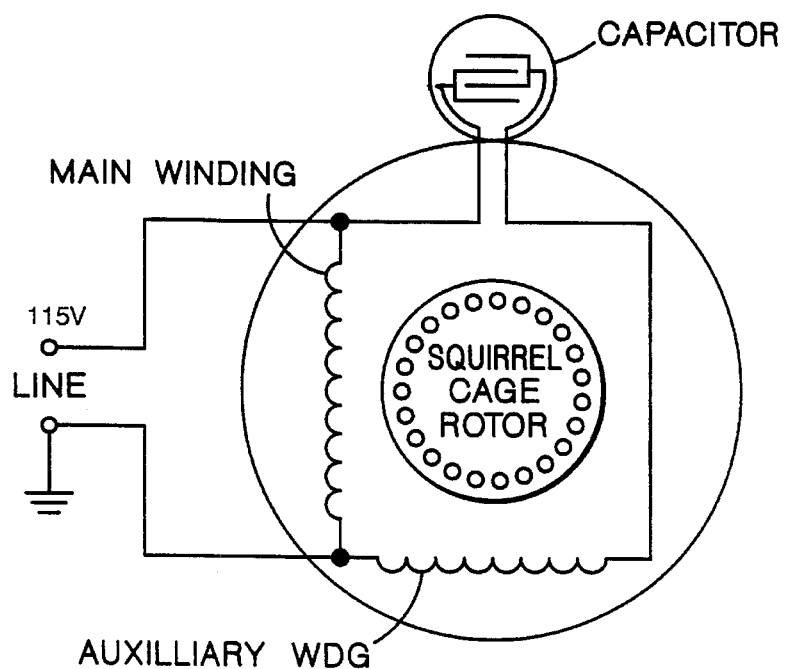
FIG. 6 shows schematically a permanent-split capacitor motor, the type of motor used in the preferred embodiment.
Figure 7:
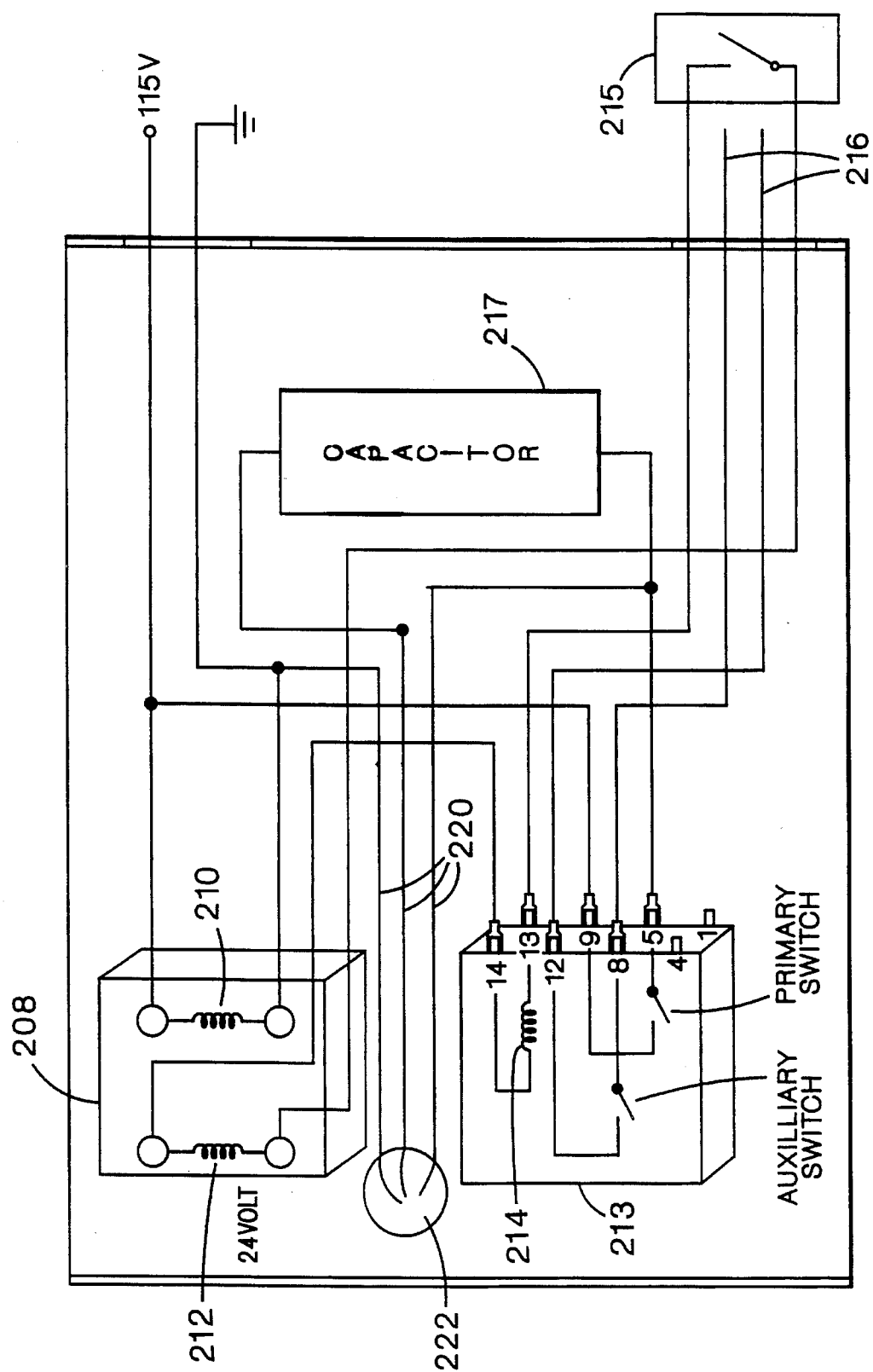
FIG. 7 shows a wiring diagram of the preferred embodiment of the zoning circulator.

A capacitor 217 (5 μF, 250 V) is also enclosed within the controller 200, as the motor 100 is preferably configured as a permanent-split capacitor motor (FIG. 6). A spring metal capacitor clip 218 secures the capacitor 217 within the controller housing 202.

Motor leads 220 pass to the stator windings 124 through a controller housing opening 222 and an opening 223 in the motor housing.

Figure 8:
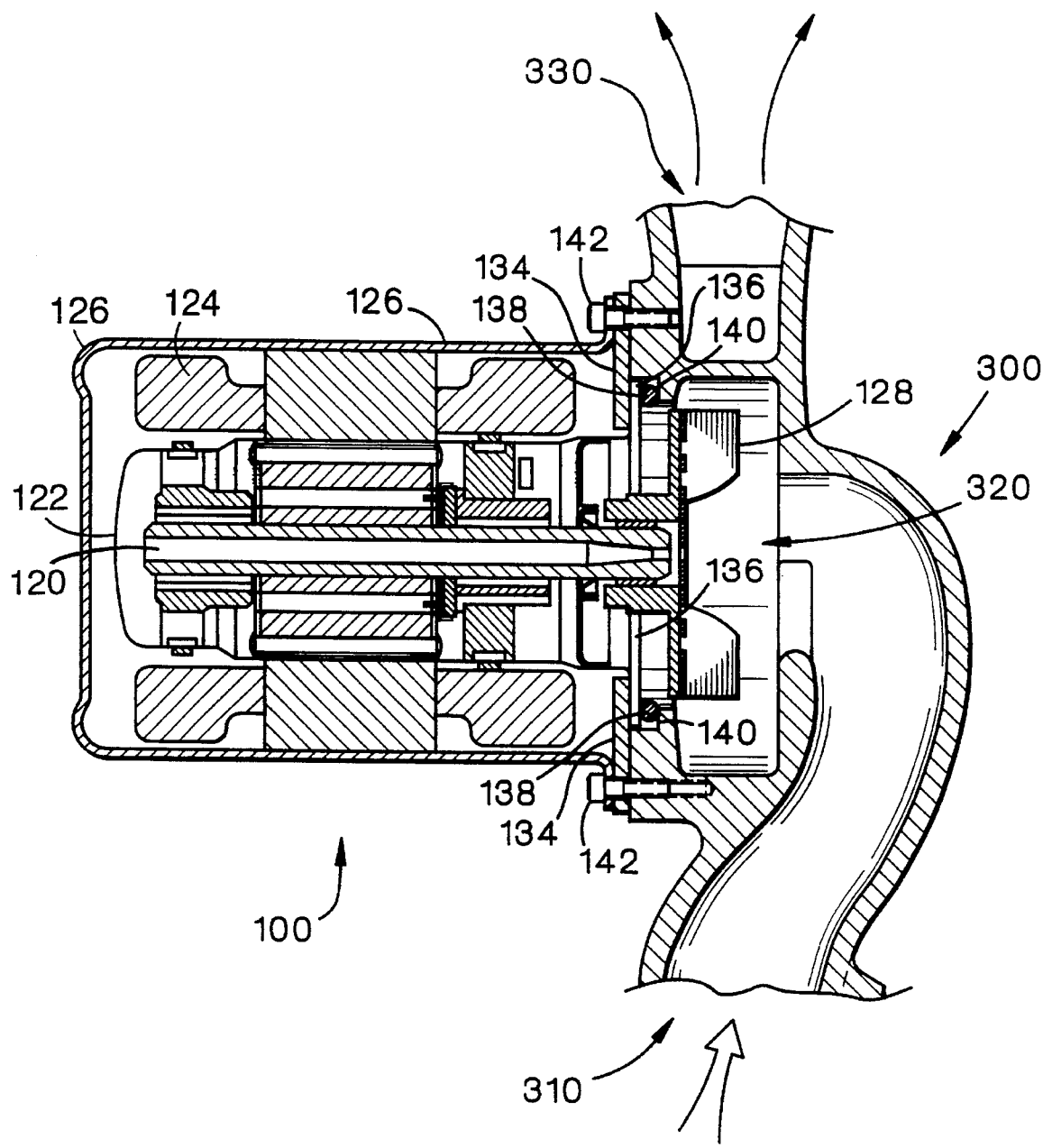
FIG. 8 shows a sectional view of the motor connected to the impeller casing, with most of the impeller casing broken away.
Figure 9:
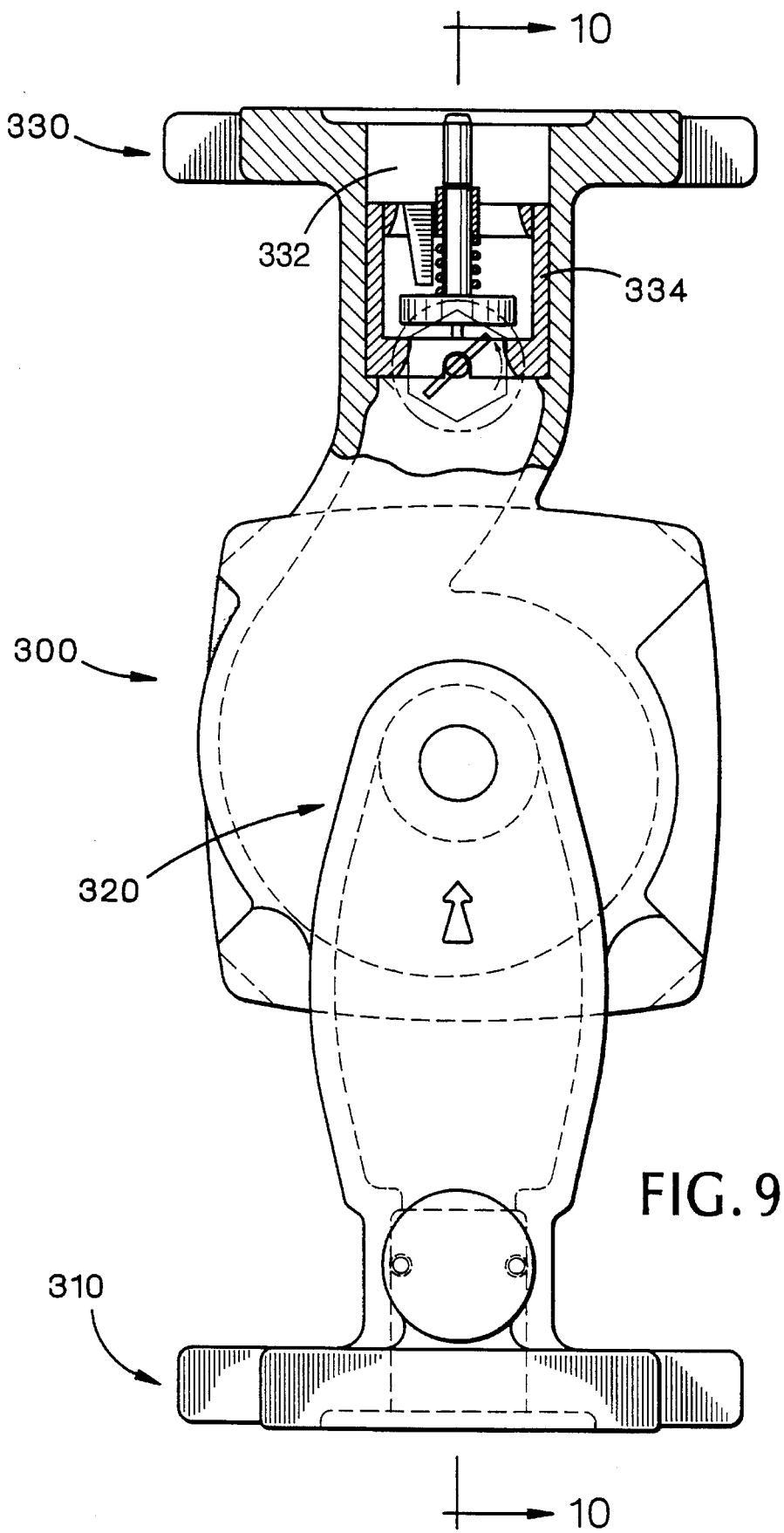
FIG. 9 shows an end view of an embodiment of the impeller casing of the zoning circulator having an integral check valve and an integral ball valve.

With reference now to FIG. 8, the motor housing 126 is enclosed by a cover plate 134 through which the cartridge 122 is inserted. A lip 136 on the cartridge 122 fits within a counterbore in the impeller casing 300. An O-ring 138 fits between the lip 136 and the shoulder 140 of the counterbore. Fluid is free to enter the rotor housing 122, as it is preferable to use a hollow shaft, water lubricated rotor. O-ring 138 prevents fluid from entering the motor housing 126, in which the stator windings are located. The motor 100 is bolted to the impeller casing 300 using attachment bolts 142, with the impeller 128 protruding into the impeller casing.

The impeller casing 300 is a casting of suitable material, most commonly iron or bronze. It includes an inlet end 310, an impeller zone 320, and an outlet end 330. When the motor is activated, fluid flows into the inlet end 310 and passes into the impeller zone 320. The fluid flows into the center of the impeller 128 and is spun outward, passing out of the impeller casing via the outlet end 330.

In operation, when thermostat 215 closes due to a temperature change in the area of the building being served by the zoning circulator, 24 volts from the secondary coil 212 of the transformer 208 is applied to the relay coil 214, causing the relay switches to close. Line voltage flows through one of the relay switches to the pump motor 100, activating the pump, which circulates fluid through the zone being served by the zoning circulator.

When the circulator for a given zone is not operating, it is important for the fluid line into the particular zone to be securely sealed off. Otherwise, fluid may circulate backwards through the zone due to back pressure from other zones; or forwards through the zone due to gravity circulation—the phenomenon where cooler, denser fluid in the return lines of the particular zone "falls," suctioning heated, less dense fluid into the given zone. In a preferred embodiment of the invention, an integral, replaceable check valve provides the necessary sealing.

Figure 10:
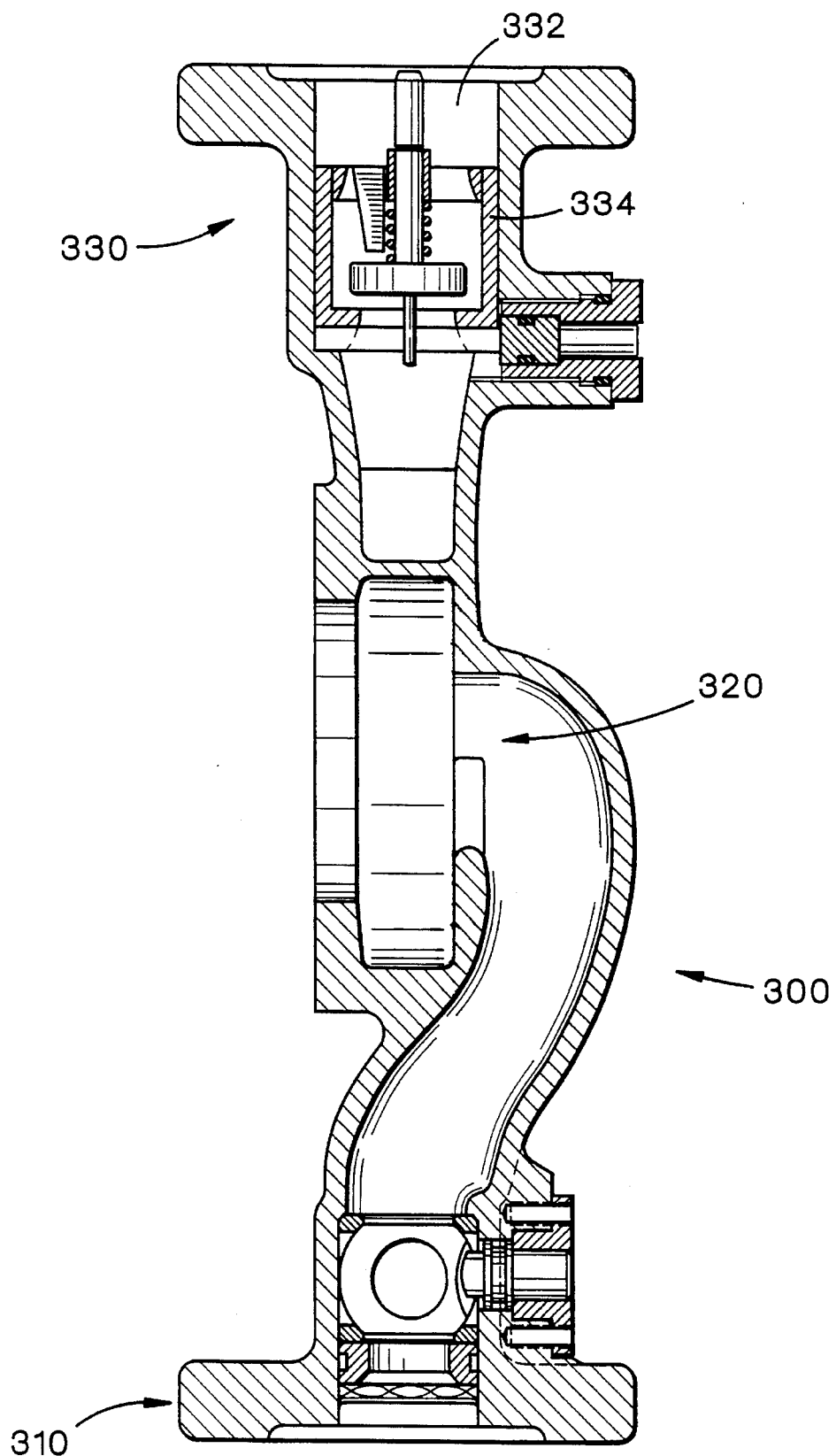
FIG. 10 shows a sectional view of the embodiment of the impeller casing taken along 10—10 of FIG. 8.
Figure 11:
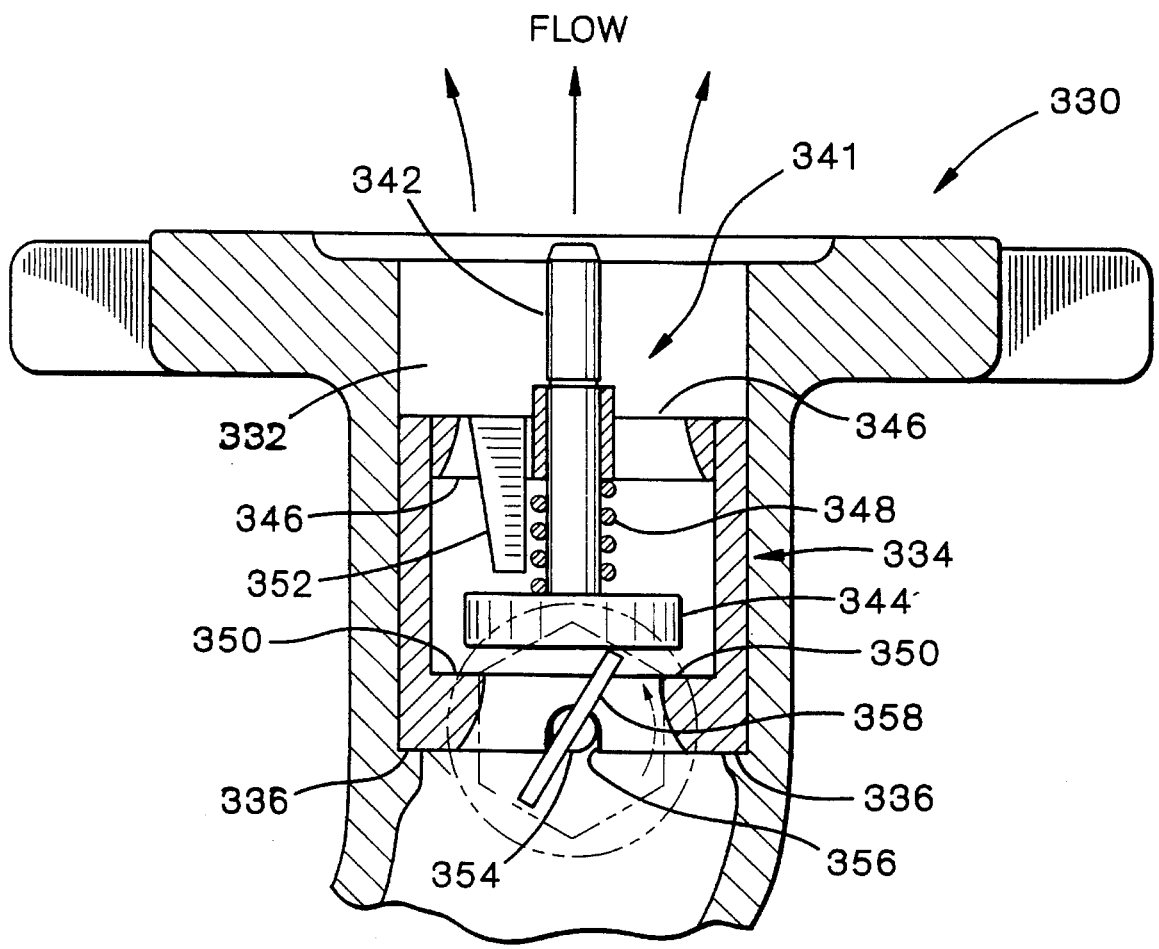
FIGS. 11 and 12 are enlarged views of the check valve end of the impeller casing shown in FIGS. 9 and 10, respectively, with the check valve shown partially open.
Figure 12:
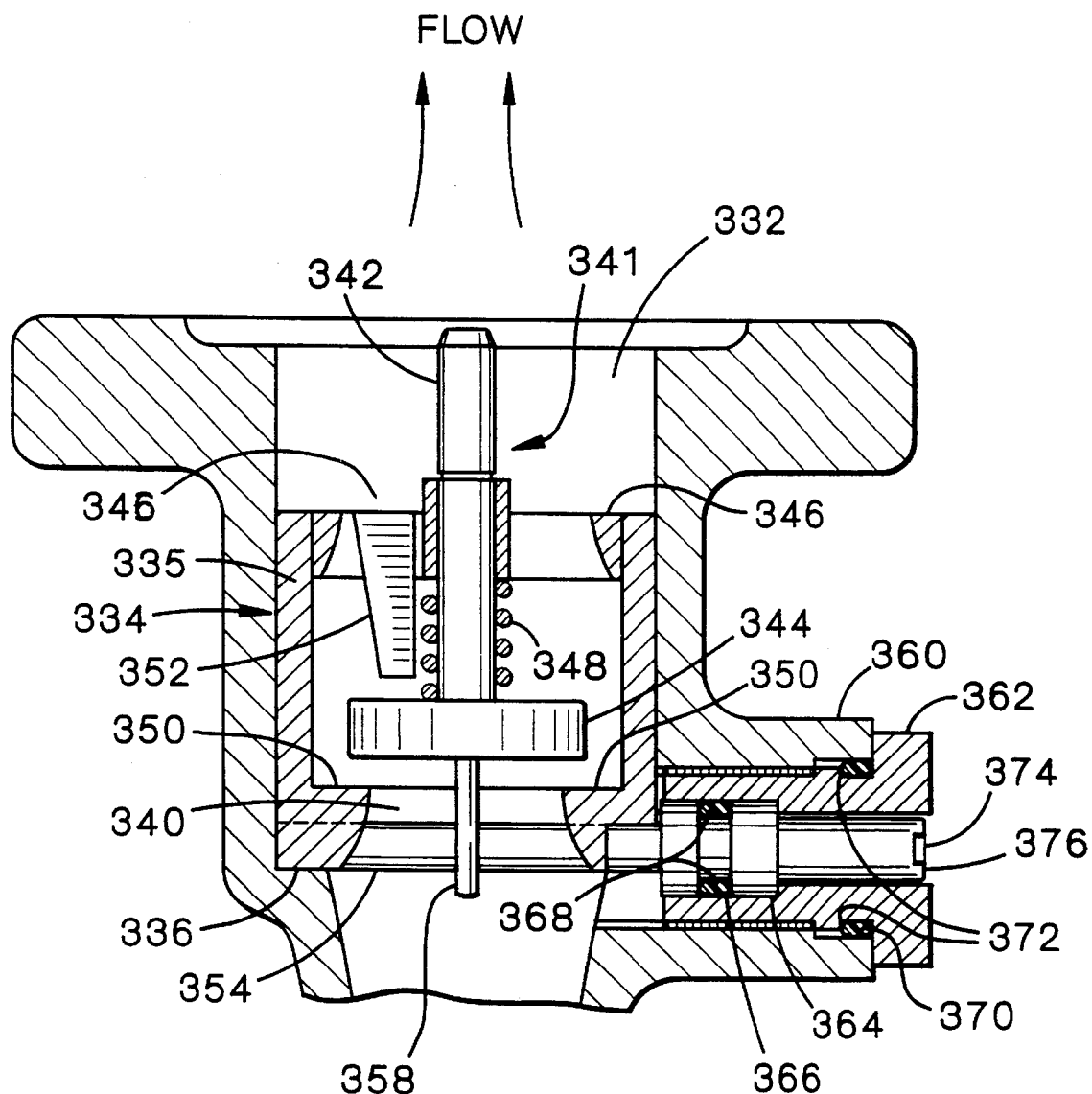

With reference to FIGS. 9, 10, 11, and 12, the outlet end 330 of such an embodiment has a check valve cavity 332 into which a removable check valve cartridge 334 is inserted. Referring to FIGS. 11 and 12, the check valve cartridge 334 includes a cylindrical cartridge housing 335, which abuts an annular shoulder 336 machined into the impeller casing 330.

The check valve 341 includes a stem 342 and a disc-shaped, rubber coated valve head 344. The stem 342 is supported by and slides within a spider bracket 346. The spider bracket 346 spans the top of the check valve cartridge 334 and allows fluid to pass through the assembly. A compression spring 348 disposed around the stem 342, and between the spider bracket 346 and the valve head 344, biases the check valve 341 against a valve seat 350 at the bottom of the check valve cartridge 334. It has been found in practice that gravity circulation can generate on the order of 0.5 psi of fluid pressure on the check valve in the opening direction. The compression spring 348 must be stiff enough to resist this pressure, but flexible enough to allow the check valve 341 to lift off the valve seat 350 when the pump 100 is active.

One or more fingerlike projections 352 act as stops which prevent overcompression of the compression spring 348.

The check valve assembly is further configured so as to be capable of manual opening. In the event the motor 100 is not functioning, it is possible to obtain nominal circulation due to gravity circulation by opening the check valve 341. An opening stem 354 traverses a flow passageway 340 and is rotatable within a pair of rounded notches 356 in the bottom of the check valve cartridge 334. A cam pin 358 projecting perpendicularly from the opening stem 354 lifts the valve head 344 from the valve seat 350 when the opening stem 354 is rotated.

The opening stem 354 extends outward through a stack 360 cast into the impeller casing 300. A threaded restraining collar 362 which surrounds the opening stem 354 is fastened to stack 360 via screw threads. The restraining collar 362 fits over an integral bushing 364 on the opening stem and restrains the opening stem 354 within the impeller casing 300. One O-ring 366 fits in an annular groove 368 around the bushing 364, and another O-ring 370 fits in an annular groove 372 around the exterior of the restraining collar 362. The O-rings 366, 370 prevent fluid from leaking from the impeller case 300 via the stack 360. A slot 374 in the exterior end 376 of the opening stem allows the check valve to be opened with an instrument such as a screwdriver.

Whereas the check valve assembly is located downstream with respect to the impeller zone, it is advantageous to have shut-off means located on the upstream side of the impeller zone. Without such additional shut-off means, the entire system would need to be drained before removing the motor 100 for servicing so as to avoid having the operating fluid rush out of the opened impeller casing 300. With an upstream shut-off, however, all that is spilled is the fluid in the casing 300 itself. In a preferred embodiment of the invention, an integral ball valve, located in the inlet end 310 of the impeller casing, provides the necessary upstream shut-off.

Figure 13:
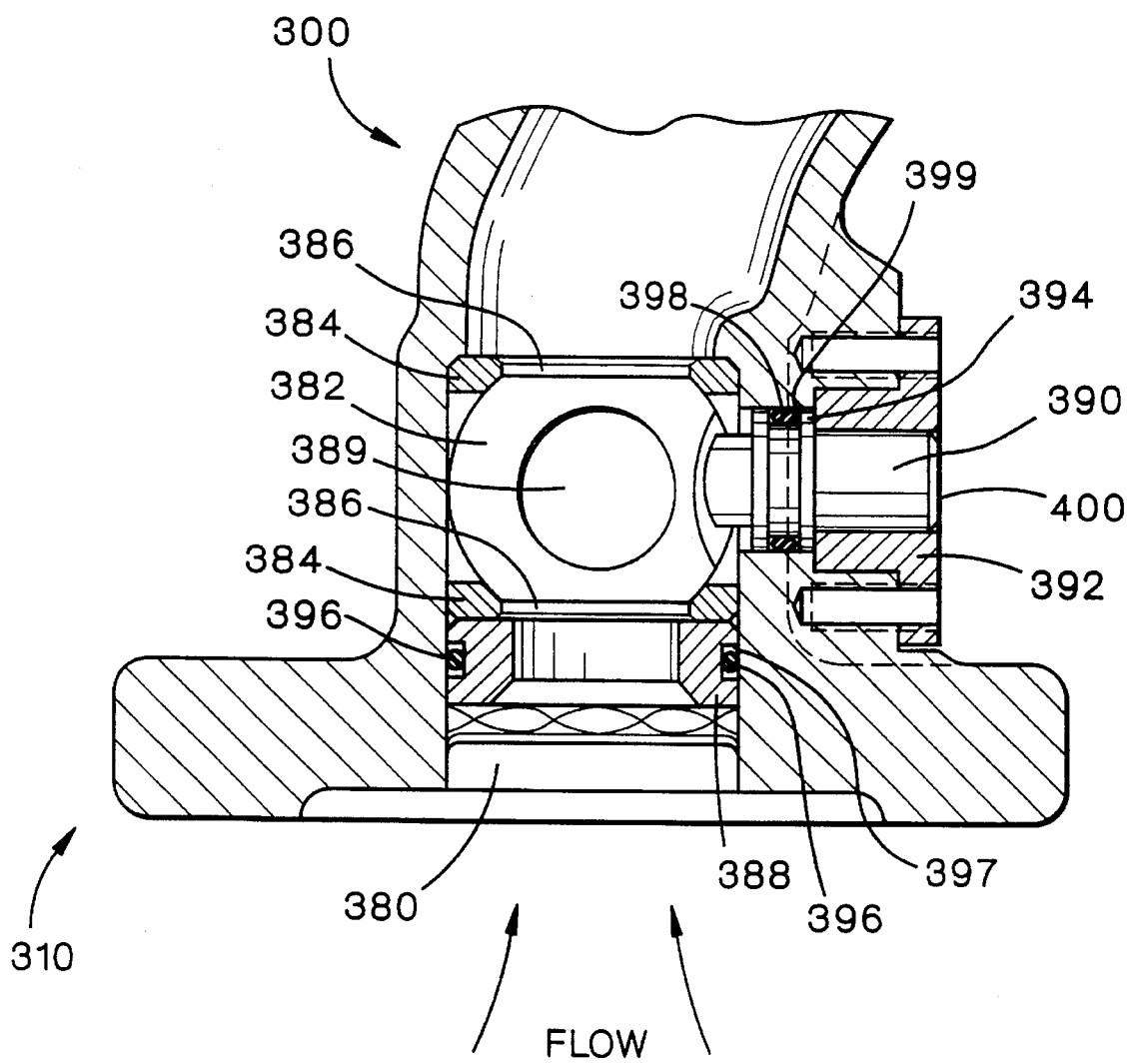
FIG. 13 is a enlarged view of the ball valve end of the impeller casing shown in FIG. 10, with the ball valve shown in the closed position.

With reference to FIGS. 10 and 13, the inlet end 310 has a ball valve cavity 380 in which a ball element 382 is located. The ball element 382 is secured within the cavity 380 by opposingly facing cup retainers 384 in which the ball element 382 is free to rotate. Flow passages 386 through the cup retainers, and a bore hole 389 through the ball element 382, allow fluid to flow into the impeller casing 300 when the ball valve is in the open position. A packing gland 388, with a flow passageway through it, secures the assembly within the ball valve cavity 380.

A stem 390 extends from the ball element 382 to the exterior of the impeller casing 300. A restraining collar 392 is bolted to the impeller casing 300 and abuts a bushing 394 which protrudes from the stem 390, thereby preventing translational movement of the ball element 382.

One O-ring 396 fits within an annular groove 397 in the packing gland 388; another O-ring 398 fits within an annular groove in the bushing 394. The O-rings 396, 398 prevent fluid from leaking past the ball element 382 or out of the impeller casing 300. A slot (not shown) in the exterior surface 399 of the stem 390 allows the ball valve to be opened or closed with an instrument such as a screwdriver.

Figure 14:
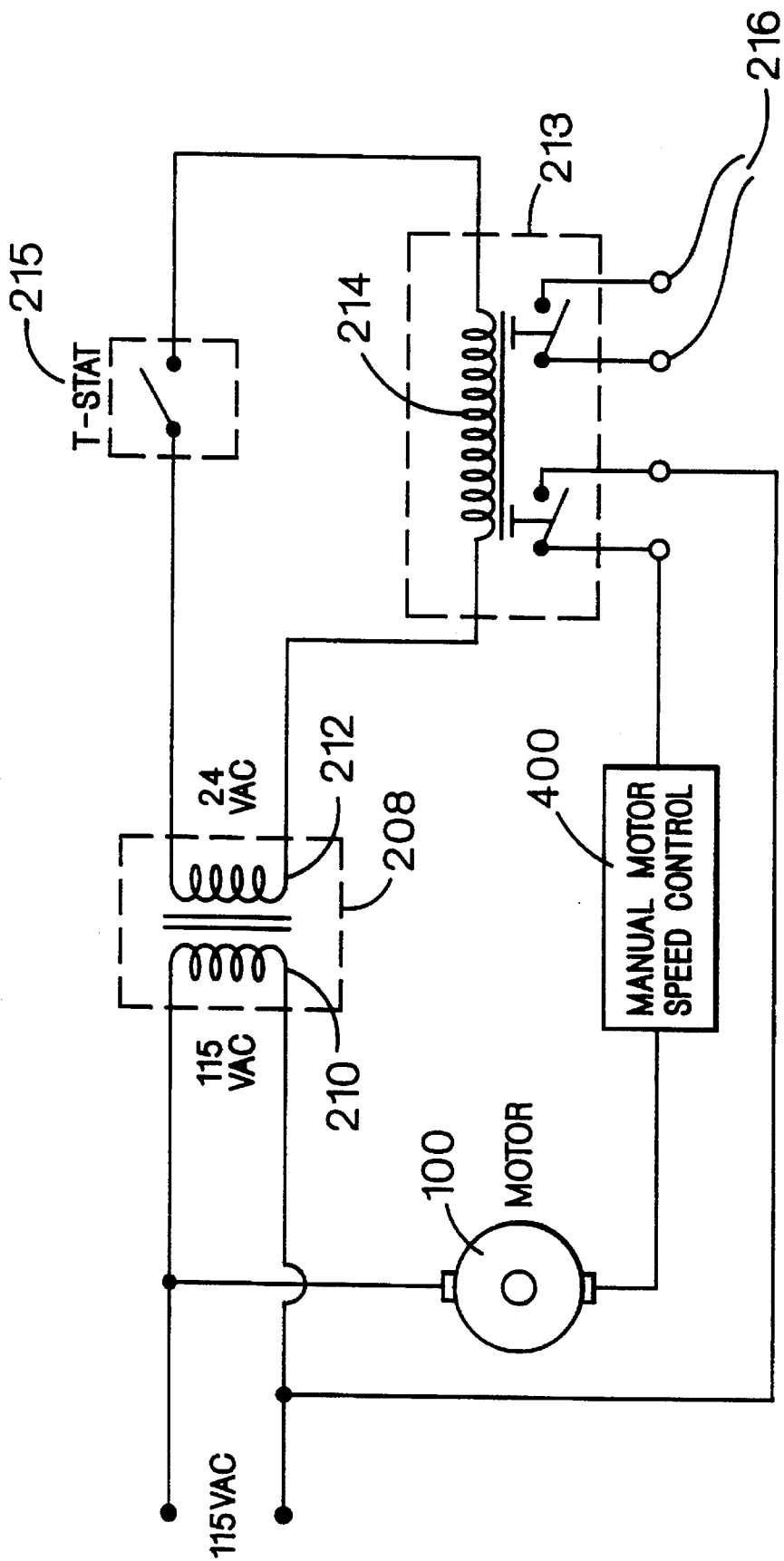
FIG. 14 shows schematically the primary electrical components of an alternate embodiment of the zoning circulator.

Referring to FIG. 14, controller 200 may alternatively include a manual motor control circuit 400 connected in series between relay 213 and motor 100. Motor control circuit 400 is fabricated on a printed circuit board mounted within housing 202 or in a separate enclosure fastened to housing 202 and allows the user to adjust the speed of the motor.

Figure 15:
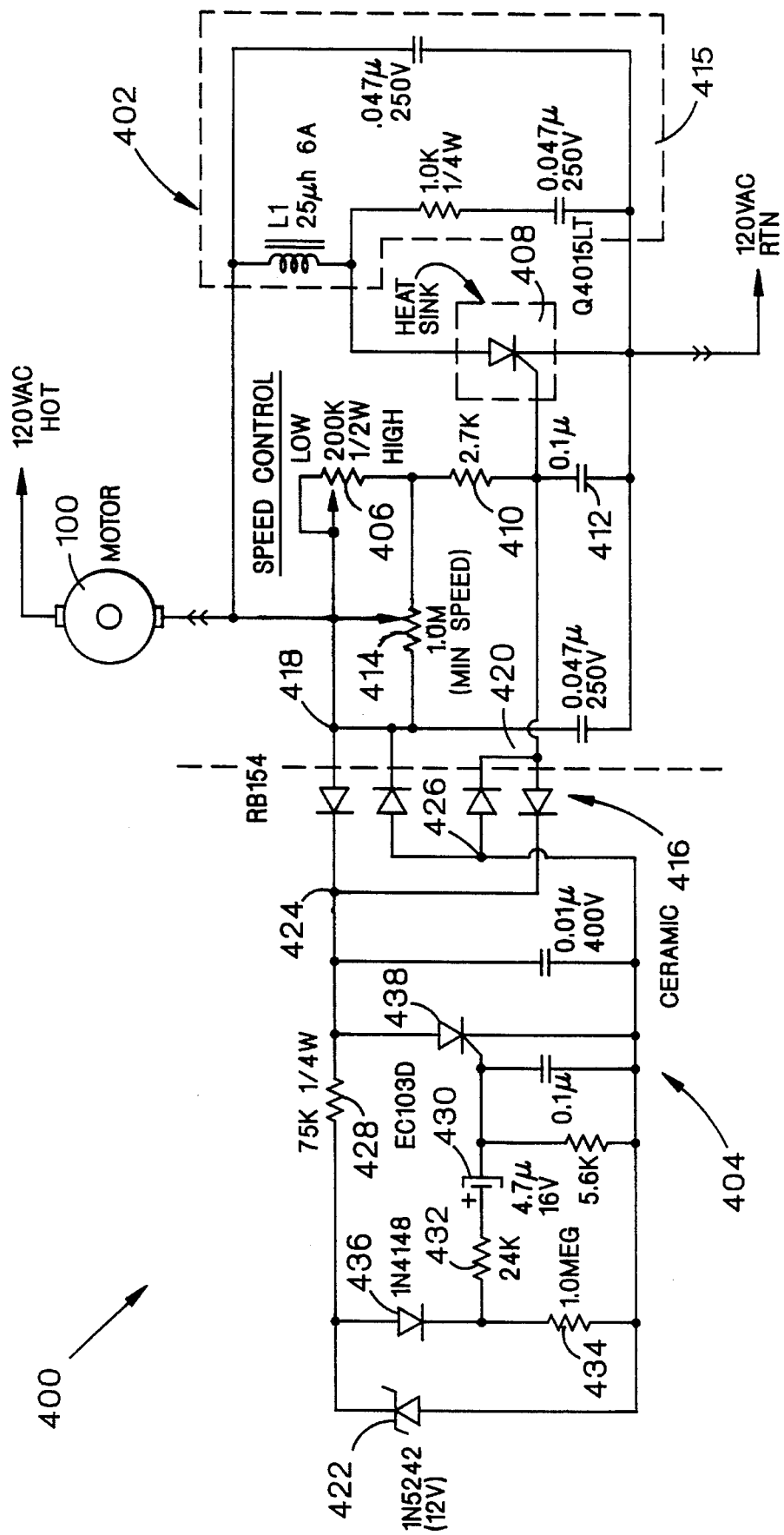
FIG. 15 is a schematic diagram of a manual motor control circuit.

Motor control circuit 400, shown schematically in FIG. 15, can be separated into two major sections, a speed control circuit 402 and a quick start circuit 404 (separated by dashed line A—A). The speed of the motor is controlled with speed control 402 circuit by adjusting the setting of a 200 KΩ potentiometer 406 mounted on the printed circuit board. Control potentiometer 406 is connected between motor 100 and the gate of a quadrac 408 (Model No. Q4015LT, Teccor Electronics, Irving, Tex.) through a 2.7 KΩ resistor 410.

As is generally known in the art, a quadrac is a four terminal AC current switching device generally used to control high level load signals, such as those required for operating motor 100, using much lower level signals. A quadrac can be thought of as a triac having a diac 409 connected in series with its gate. In general, when a sufficient amount of current flows through the gate (the third terminal) of the quadrac, a low impedance path between the cathode and anode of the triac is provided which allows load power to flow through the device and on to motor 100. The triac maintains this on state until the current level drops below a required level, such as when the AC signal passes through a zero crossing at which time current carriers drift out of the gate and the triac is switched off. The triac is then required to be triggered or "fired" to place it back in its conducting state. Quadrac 408 is triggered when the voltage breakdown of diac 409 (the fourth terminal of quadrac 408) is exceeded.

In operation, when the AC signal applied to motor 100 passes through its zero crossing, quadrac 408 is switched into its non-conducting state and current flowing through potentiometer 406 and resistor 410 begins to charge 0.1 μfarad capacitor 412. When the voltage across the capacitor reaches the voltage breakdown of diac 409, the diac conducts and allows capacitor 412 to discharge through the diac into the gate of quadrac 408. This allows the full waveform of the AC signal to be applied to motor 100 until the next zero crossing where the voltage begins to build up in the opposite direction. The time between a zero crossing and the turn-on of quadrac 408 is dependent on the time required to charge the capacitor which is controlled by the resistance setting of control potentiometer 406. Thus, the higher the resistance setting of potentiometer 406, the longer it takes to charge capacitor 412, the later into the cycle the signal is when the triac is fired and the slower the motor runs.

If control potentiometer 406 is set at its maximum setting, motor 100 may never operate because the voltage across capacitor 412 never reaches the breakdown voltage of the diac during a half cycle of the AC signal. For this reason, a one MΩ minimum speed potentiometer 414 is connected in parallel with control potentiometer 406 so that the resistance between the motor and capacitor has a maximum value that never exceeds the parallel value of the resistance settings of the control and minimum speed potentiometers. The setting of minimum speed potentiometer 414 will be generally dependent on the load presented to motor 100 and the minimum speed acceptable to the user. Generally, the minimum setting will be greater in applications where the motor has a lighter load and is decreased as the load increases.

Speed control circuit 402 further includes an EMI noise suppression circuit 415 (enclosed in dashed lines) connected across quadrac 408 to filter radio interference which may effect performance of the controller.

Quick start circuit 404 includes a full-wave bridge rectifier 416 having a first input electrode 418 connected to the wiper arms of both the control and minimum speed potentiometers as well as one of the terminals of motor 100. A second input electrode 420 of the rectifier is connected directly to quadrac 408 through its diac. A 12 V zener diode 422 for limiting the voltage across the quick start circuit to 12 volts is connected across first and second output electrodes 424, 426 of rectifier 416 through a current limiting resistor 428. Quick start circuit 404 further includes a 4.7 μfarad capacitor 430 with a first terminal connected through a 24 KΩ resistor 432 to the junction of a 1 MΩ resistor 434 and a logic diode 436 (1N4148). A second terminal of the capacitor is connected to the gate of a silicon control rectifier (SCR) diode 438 (Model No. EC103D, Teccor Electronics, Irving, Tex.).

In operation, zener diode 422 limits the voltage applied across the quick start circuit to 12 volts. When the 12 volt threshold is reached, current flows through current limiting resistor 428, logic diode 436 and resistor 432 so that capacitor 430 begins to charge. The capacitor charge current flows through the gate of SCR diode 438 and places the SCR in conduction causing current to flow to the diac of quadrac 408. Thus, if a sufficient amount of current is flowing through the gate of quadrac 408, the quadrac conducts and motor 100 runs. Charge on capacitor 430 continues to increase in step-wise fashion through both half cycles of the AC signal until the voltage across the capacitor reaches 12 volts, at which point current flow to SCR diode 438 ceases, current flow to quadrac 408 terminates.

With this arrangement, quadrac 408 is in a conducting state when the motor is first turned on, independent of speed control circuit 402. The values of capacitor 430 and resistors 432, 434 are selected here to provide a charge time of between three and seven seconds. When the capacitor is fully charged, current provided to quadrac 408 from quick start circuit 404 is shut off and control of the speed of the motor is provided by control potentiometer 406 of speed control circuit 402. Capacitor 430 in the quick start circuit does not discharge until the 120 VAC being applied to motor 100 is turned off. When the 120 VAC is reapplied to motor 100, application of quick start circuit 404 is reinitiated. As a result, motor 100 is operated at maximum speed for a period sufficient to overcome the initial frictional resistances between the moving parts of the motor.

In many hydronic systems, it is desirable that the speed of the circulator motor be controlled by a sensor, such as a thermostat or aquastat, located in one of the zones of the system. In such applications, electrical signals from the sensor are provided directly to the circulator controller to vary the speed of the circulator.

Figures 16, 17:
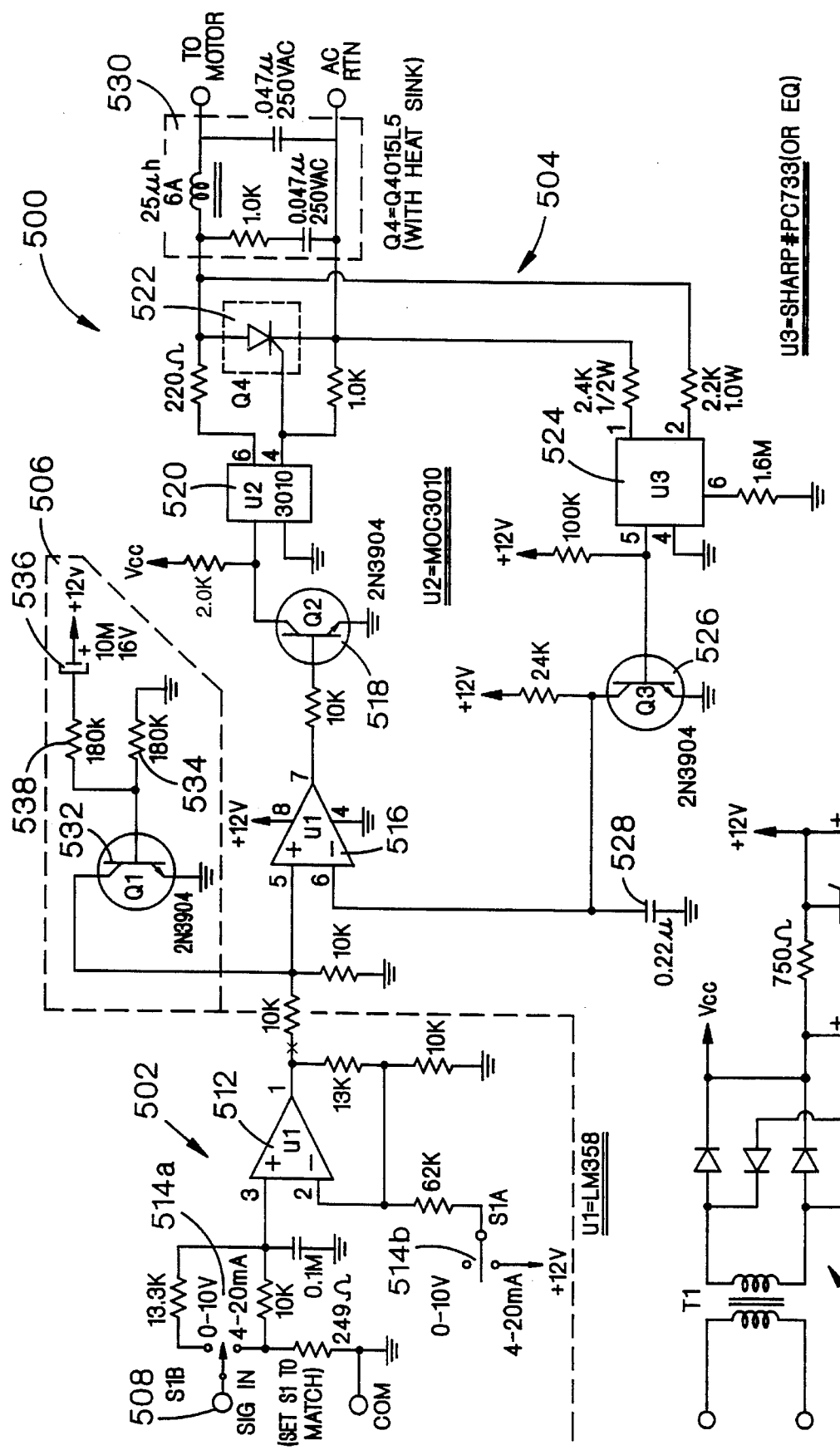
FIG. 16 is a schematic diagram of a remote motor control circuit, controller circuit.
FIG. 17 is a schematic diagram of a power supply circuit used in conjunction with the circuit of FIG. 16.

As shown schematically in FIG. 16, a variable speed control circuit 500 includes three major sections, a reference circuit 502, an output switching circuit 504, and a quick start circuit 506. A power supply circuit 507 for providing proper supply voltages to the control circuit 500 is shown in FIG. 17.

Reference circuit 502 receives electrical signals provided by a thermostat or an external controller at input terminal 508 and converts them to driver speed voltage signals applied to driver amplifier 512. Reference circuit 502 receives either voltage signals in the range of zero to 10 V or current signals between 4 and 20 milliamperes and are selected with a double-pole double-throw switch. A first one of the pair of switches 514a selects whether the input is a current or a voltage signal while the other switch 514b provides the proper bias to amplifier 512. The choice of voltage or current input signals is dependent on the particular type of thermostatic sensor or external controller used in the hydronic system. Regardless of the type of input signals selected, the signal provided at the output of operational amplifier 512 is between zero volts for maximum motor speed and 10 V for minimum motor speed.

Output switching circuit 504 controls the time delay switching of operation of the motor and includes a driver amplifier 516, a first switching transistor 518, an optical coupler 520 (model no. MOC3010, manufactured by Motorola Corp., Phoenix, Ariz.), a switching triac 522, an optical transistor 524 (Model No. PC733, manufactured by Sharp Electronics Corp., Camas, Wash.) and a second switching transistor 526, all arranged in a loop which resets at every occurrence of a zero crossing of the AC signal across switching triac 522.

Driver amplifier 516 is a differential amplifier having a positive input connected to the output of reference circuit 502 and a negative input connected to a 0.22 µfarad capacitor 528. The output of the driver amplifier biases the gate of switching transistor 518 into its on state when the voltage at the positive input is more positive than at the negative input of the differential amplifier and switches transistor 518 off in the opposite condition. Switching transistor 518 has its collector connected to a light emitting diode (not shown) internal to the optical coupler 520. The light emitting diode is used to illuminate a low power optical triac (not shown) to cause current to flow through the optical triac thereby triggering switching triac 522. Optical coupler 520 isolates the low voltage control portion of the circuit from the high power AC signal portion required to drive motor 100.

Optical transistor 524 including a pair of LEDs for illuminating an optical photo transistor (neither shown) is connected across switching triac 522 and has an output driving switching transistor 526. The collector of the switching transistor 526 is connected to both capacitor 528 and the negative input of differential amplifier 516.

Output switching circuit 504 also includes the same EMI noise suppression circuit 530 connected across switching triac 522 used in conjunction with manual motor control circuit 400 to reduce noise interference.

Quick start circuit 506 includes a transistor 532 having its collector connected to the positive input terminal of differential amplifier 516 and its base connected to ground through a 180 KΩ resistor 534. In parallel with the resistor 534 is a second 180 KΩ resistor 535 in series with a 10 µfarad, 16 volt capacitor 536 connected to a +12 volt supply.

In operation, any voltage across the terminals of the switching triac 522 causes current to flow through the gate of the triac triggering it into its on state. Once triac 522 is triggered it remains in the conducting state as long as there is sufficient current flowing through the device. However, when the AC signal passes through a zero crossing, which occurs twice in every cycle (once during the positive half cycle and once during the negative half cycle) the triac is turned off and can only be triggered back on by output coupler 520. The period of time required for the output coupler to provide a pulse is dependent on the level of signal (0–10 volts) applied to the positive terminal of differential amplifier 516.

During the period that switching triac 522 is conducting, optical transistor 524 is in the off state. However, when the AC signal passes through a zero crossing, switching triac is turned off and optical transistor 524 is switched on. Second switching transistor 526 is then turned off and capacitor 528 begins to charge from the +12 volt supply through 24 KΩ resistor 538. When the voltage across capacitor 538 becomes more positive than the voltage at the positive terminal of differential amplifier 516, the output of the amplifier goes low causing the first switching transistor 518 to turn off. With switching transistor 518 off, current from the Vcc supply passes through the 2 KΩ resistor to LED the light emitting diode in optical coupler 520 which illuminates and triggers low power optical triac which in turn triggers switching triac 522 into its on state. When switching triac is triggered, optical transistor immediately turns off, causing second switching transistor to conduct so that capacitor 528 can discharge. Switching triac 522 remains in its conducting state and motor 100 continues to run until the next zero crossing.

Thus, when the input signal applied to the output switching circuit is small, the capacitor discharges relatively quickly (i.e., less time is required to charge capacitor 528 to a voltage more positive than the input signal), the switching triac is triggered sooner and motor 100 runs at a greater speed. On the other hand, when the input signal is large, the period required to charge the capacitor 528 is longer, the switching triac is triggered much later in the AC cycle and the motor runs at a slower speed.

Quick start circuit 506 similarly provides the same maximum speed startup function to variable speed controller 500 as the quick start circuit 404 in the manual motor controller circuit of FIG. 15. In this embodiment, when the hydronic system is initially turned on, the positive capacitor 536 begins to charge from the +12 volt supply through transistor 532. During the time required to charge capacitor 536, the positive terminal of the differential amplifier is connected to ground through the transistor and because the negative terminal is more positive, the triac is maintained in its conducting state and motor 100 is run at its maximum speed. Capacitor 536 continues to charge until the voltage across resistor 534 is less than the voltage across the base and emitter junction of transistor 532 at which time the transistor is switched off and the signal at the positive terminal of the differential amplifier 516 is set to the level provided by reference circuit 502.

Thus, when the hydronic system is first turned on, motor 100 is driven at maximum power for the time required to charge capacitor 536 of quick start circuit 506 to overcome frictional forces caused by corrosion when the motor is left unoperated for long periods of time. As was the case in the quick start circuit of the manual motor control circuit, the values of capacitor 536 and resistors 534, 535 determine the period that maximum speed starting is provided and here, is selected to be about five seconds. At the end of the maximum speed starting period, control is returned to the variable speed motor control portion of the circuit and the speed of the motor tapers down to the speed represented by the input signals from the external thermostat.

Having thus described preferred embodiments of the invention, it will be appreciated that these and a great many other variations and embodiments of the invention are within the following claims. For example, the zoning circulator controller may be used with a standard wet rotor type circulator not having a transformer and relay.

What is claimed is:

1. A zoning circulator for circulating fluid within a hydronic heating or cooling system, the zoning circulator comprising:

a wet-rotor circulator motor, the circulator motor comprising:
  a motor housing,
  a stator disposed within the motor housing and sealed from the circulating fluid,
  a rotor housing disposed within the motor housing within the stator, the rotor housing being unsealed from the circulating fluid so that the fluid enters the rotor housing,
  a rotor disposed within the rotor housing and in contact with the fluid, and
  an impeller affixed to one end of the rotor, the stator and rotor configured with respect to one another so that the rotor is caused to rotate when the stator is energized;

an impeller casing fastened to the motor housing, the impeller casing including an inlet end for accepting the circulating fluid flowing into the impeller casing, an impeller zone into which the impeller extends from the motor, the impeller zone being in fluid communication with the inlet of the impeller casing, and an outlet end for discharging the circulating fluid flowing from the impeller casing, and a circulator controller physically attached to the circulator motor and including a speed regulating circuit for providing electrical drive signals to the motor to operate the motor, the speed regulating circuit controlling a rate at which the electrical drive signals are provided to the motor, the rate being representative of a preselected speed across a range of speed settings between a predetermined minimum speed setting and a predetermined maximum speed setting, wherein the speed regulating circuit operates the circulator motor for a predetermined initial period at a speed setting sufficient to generate a torque to overcome frictional resistances in the circulator motor and thereafter operates the circulator motor at the preselected speed setting of the speed regulating circuit.

2. The zoning circulator of claim 1 wherein the speed setting generating the torque sufficient for overcoming frictional resistances in the circulator motor is the predetermined maximum speed setting.

3. The zoning circulator of claim 1 wherein the circulator controller further comprises an electrical switch connected to the circulator motor and the speed regulating circuit, the switch, including at least one low voltage activation terminal and at least one pair of high voltage switched terminals for receiving a high voltage supply signal, the electrical switch being configured to switch the high voltage switched terminals when low voltage is supplied to the activation terminals.

4. The zoning circulator of claim 3 wherein the electrical switch is a solid-state AC switching device.

5. The zoning circulator of claim 1 wherein the speed regulating circuit comprises an override circuit including a resistor and capacitor network and the predetermined duration of operation of the override circuit is related to the values of the resistor and capacitor.

6. A zoning circulator for circulating fluid within a hydronic heating or cooling system, the zoning circulator comprising:

a circulator motor;

a circulator controller physically attached to the circulator motor, the circulator controller comprising, a voltage transforming device for receiving and transforming a high voltage supply signal to a low voltage, an electrical relay connected to the transforming device, including at least one low voltage activation input terminal and at least one pair of high voltage switched output terminals for receiving the high voltage supply signal, the relay being configured to switch the output terminals when low voltage from the transforming device is supplied to the activation input terminals, an electrical switch, connected between the electrical relay and the circulator motor, having at least one low voltage activation input terminal and at least one pair of high voltage switched output terminals for receiving the high voltage supply signal from the electrical relay, the electrical switch being configured to switch the output terminals when low voltage is supplied to the activation input terminals, a speed regulating circuit connected between the electrical switching device and the circulator motor for controlling the speed of the circulator motor and for providing low voltage signals to the at least one low voltage activation input terminal of the electrical switch to control a rate at which the high voltage supply signal at the at least one pair of high voltage switched output terminals are provided to the motor, the rate being representative of a preselected speed within at a preselected speed across a range of speed settings between a predetermined minimum speed setting and a predetermined maximum speed setting, and an override circuit connected to the electrical switch for overriding the speed regulating circuit upon initial application of the high voltage supply signal to operate for a predetermined duration the circulator motor at a speed setting sufficient to generate a torque to overcome frictional resistances in the circulator motor, the speed regulating circuit thereafter operating the circulator motor at the preselected speed setting.

7. The zoning circulator of claim 6 wherein the speed regulating circuit is manually controlled to operate at the preselected speed setting.

8. The zoning circulator of claim 6 wherein the zoning circulator further includes a minimum speed control device to establish a minimum speed setting of operation for the circulator motor.

9. The integrated zoning circulator of claim 6, wherein the voltage transforming device is a transformer.

10. The zoning circulator of claim 6 wherein the preselected speed setting of the speed regulating circuit varies in response to a varying thermal load of the system.

11. A zoning circulator for circulating fluid within a hydronic heating or cooling system, the zoning circulator comprising:

a circulator motor;

a circulator controller, physically attached to the circulator motor, including an electrical switch, connected to the circulator motor, having at least one low voltage activation input terminal and at least one pair of high voltage switched output terminals for receiving a high voltage supply signal, the electrical switch being configured to switch the output terminals when low voltage is supplied to the activation input terminals, and a speed regulating circuit connected to the electrical switch for operating the circulator motor at a desired speed within a range of speed settings between a predetermined minimum speed setting and a predetermined maximum speed setting, including:

an input circuit for receiving a low level electrical signal from a thermostat and for converting the electrical signal to a voltage signal representative of a desired speed setting of the motor, a time delay circuit for controlling the rate of switching of the electrical switch based on the voltage signal representative of the desired speed setting of the motor, and an override circuit connected to the electrical switch for overriding the speed regulating circuit upon initial application of the high voltage supply signal to operate for a predetermined duration the circulator motor at a speed setting sufficient to generate a torque to overcome frictional resistances in the circulator motor, the speed regulating circuit thereafter operating the circulator motor at the desired speed setting.

12. The zoning circulator of claim 11 wherein the low level electrical signal is a current signal between 4 and 20 milliamperes.

13. The zoning circulator of claim 11 wherein the low level electrical signal is a voltage signal between 0 and 10 volts.

14. The zoning circulator of claim 11 wherein the time delay circuit comprises a resistor and capacitor network and the rate of switching is related to the values of the resistor and capacitor.

15. The zoning circulator of claim 1 wherein the circulator controller further includes a controller housing integral with the circulator motor, the speed regulating circuit located within the housing.

* * * * *